United States Patent
Hong et al.

(10) Patent No.: US 10,775,474 B2
(45) Date of Patent: Sep. 15, 2020

(54) METHOD AND APPARATUS FOR SUPPORTING HYBRID MODE POSITIONING SCHEME IN WIRELESS COMMUNICATION SYSTEM

(71) Applicant: LG ELECTRONICS INC., Seoul (KR)

(72) Inventors: Jongwoo Hong, Seoul (KR); Youngdae Lee, Seoul (KR); Oanyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/613,104

(22) PCT Filed: Jun. 12, 2018

(86) PCT No.: PCT/KR2018/006621
§ 371 (c)(1),
(2) Date: Nov. 12, 2019

(87) PCT Pub. No.: WO2018/230917
PCT Pub. Date: Dec. 20, 2018

(65) Prior Publication Data
US 2020/0200860 A1   Jun. 25, 2020

Related U.S. Application Data

(60) Provisional application No. 62/518,570, filed on Jun. 12, 2017.

(51) Int. Cl.
*G01S 5/02* (2010.01)
*H04W 24/10* (2009.01)
(Continued)

(52) U.S. Cl.
CPC .......... *G01S 5/0263* (2013.01); *G01S 19/48* (2013.01); *H04B 17/318* (2015.01);
(Continued)

(58) Field of Classification Search
CPC ........................... G01S 5/0252; G01S 5/0263
See application file for complete search history.

(56) References Cited

U.S. PATENT DOCUMENTS 9,143,920 B2 * 9/2015 Do .................. G01S 5/0252
2013/0132434 A1 5/2013 Scofield et al.
(Continued)

FOREIGN PATENT DOCUMENTS

KR   100450571   9/2004

OTHER PUBLICATIONS

PCT International Application No. PCT/KR2018/006621, International Search Report dated Sep. 5, 2018, 2 pages.
(Continued)

*Primary Examiner* — Myron Wyche
(74) *Attorney, Agent, or Firm* — Lee Hong Degerman Kang Waimey

(57) ABSTRACT

A method and apparatus for supporting a hybrid mode positioning scheme in a wireless communication system is provided. While using a first positioning mode, a user equipment (UE) receives information on a triggering condition for the positioning mode switch from a network, i.e. an evolved serving mobile location center (E-SMLC). The UE determines that the triggering condition is satisfied, and switches the positioning mode from the first positioning mode to a second positioning mode.

8 Claims, 13 Drawing Sheets

(51) Int. Cl.
*H04W 64/00* (2009.01)
*H04B 17/318* (2015.01)
*H04L 5/00* (2006.01)
*H04W 72/04* (2009.01)
*G01S 19/48* (2010.01)
*H04W 88/06* (2009.01)

(52) U.S. Cl.
CPC ........... *H04L 5/0048* (2013.01); *H04W 24/10* (2013.01); *H04W 64/003* (2013.01); *H04W 72/042* (2013.01); *H04W 88/06* (2013.01)

(56) References Cited

U.S. PATENT DOCUMENTS

2014/0274130 A1* 9/2014 Venkatraman ........ G01S 5/0009
455/456.2
2018/0324740 A1* 11/2018 Edge .................... H04W 12/02

OTHER PUBLICATIONS

3rd Generation Partnership Project (3GPP), "Technical Specification Group Radio Access Network; Evolved Universal Terrestrial Radio Access Network (E-UTRAN); Stage 2 functional specification of User Equipment (UE) positioning in E-UTRAN (Release 14)," 3GPP TS 36.305 V14.1.0, Mar. 2017, 78 pages.
Gallagher, T. et al., "Power Efficient Indoor/Outdoor Positioning Handover", 2011 International Conference on Indoor Navigation (IPIN), Sep. 2011, 7 pages.

* cited by examiner

METHOD AND APPARATUS FOR SUPPORTING HYBRID MODE POSITIONING SCHEME IN WIRELESS COMMUNICATION SYSTEM

CROSS-REFERENCE TO RELATED APPLICATIONS

This application is the National Stage filing under 35 U.S.C. 371 of International Application No. PCT/KR2018/006621, filed on Jun. 12, 2018, which claims the benefit of U.S. Provisional Application No. 62/518,570, filed on Jun. 12, 2017, the contents of which are all hereby incorporated by reference herein in their entirety.

TECHNICAL FIELD

The present invention relates to wireless communications, and more particularly, to a method and apparatus for supporting a hybrid mode positioning scheme in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Positioning functionality provides a means to determine the geographic position and/or velocity of the UE based on measuring radio signals. The position information may be requested by and reported to a client (e.g. an application) associated with the UE, or by a client within or attached to the core network. The position information shall be reported in standard formats, such as those for cell-based or geographical co-ordinates, together with the estimated errors (uncertainty) of the position and velocity of the UE and, if available, the positioning method (or the list of the methods) used to obtain the position estimate.

SUMMARY

The position estimate computation may be made by a user equipment (UE) or by an evolved serving mobile location center (E-SMLC). An operation in which measurements are provided by the UE to the E-SMLC to be used in the computation of a position estimate is described as "UE-assisted" (and may also be called "E-SMLC-based"). An operation in which the UE computes its own position is described as "UE-based". In legacy positioning scheme until Rel-14, either one of UE-based mode or UE-assisted mode is supported to perform positioning measurement. However, there may be situations in which the UE is able to select positioning scheme adaptively.

In an aspect, a method for performing a positioning mode switch from a first positioning mode to a second positioning mode by a user equipment (UE) in a wireless communication system is provided. The method includes transmitting location related information of the UE to a network by using the first positioning mode, receiving information on a triggering condition for the positioning mode switch from the network, determining that the triggering condition is satisfied, and transmitting location related information of the UE by using the second positioning mode to the network.

In another aspect, a user equipment (UE) in a wireless communication system is provided. The UE includes a memory, a transceiver, and a processor, coupled to the memory and the transceiver, that controls the transceiver to transmit location related information of the UE to a network by using a first positioning mode, controls the transceiver to receive information on a triggering condition for a positioning mode switch from the network, determines that the triggering condition is satisfied, and controls the transceiver to transmit location related information of the UE by using a second positioning mode to the network.

Positioning scheme can be selected adaptively, so energy consumption of the UE can be reduced.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (01-DMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
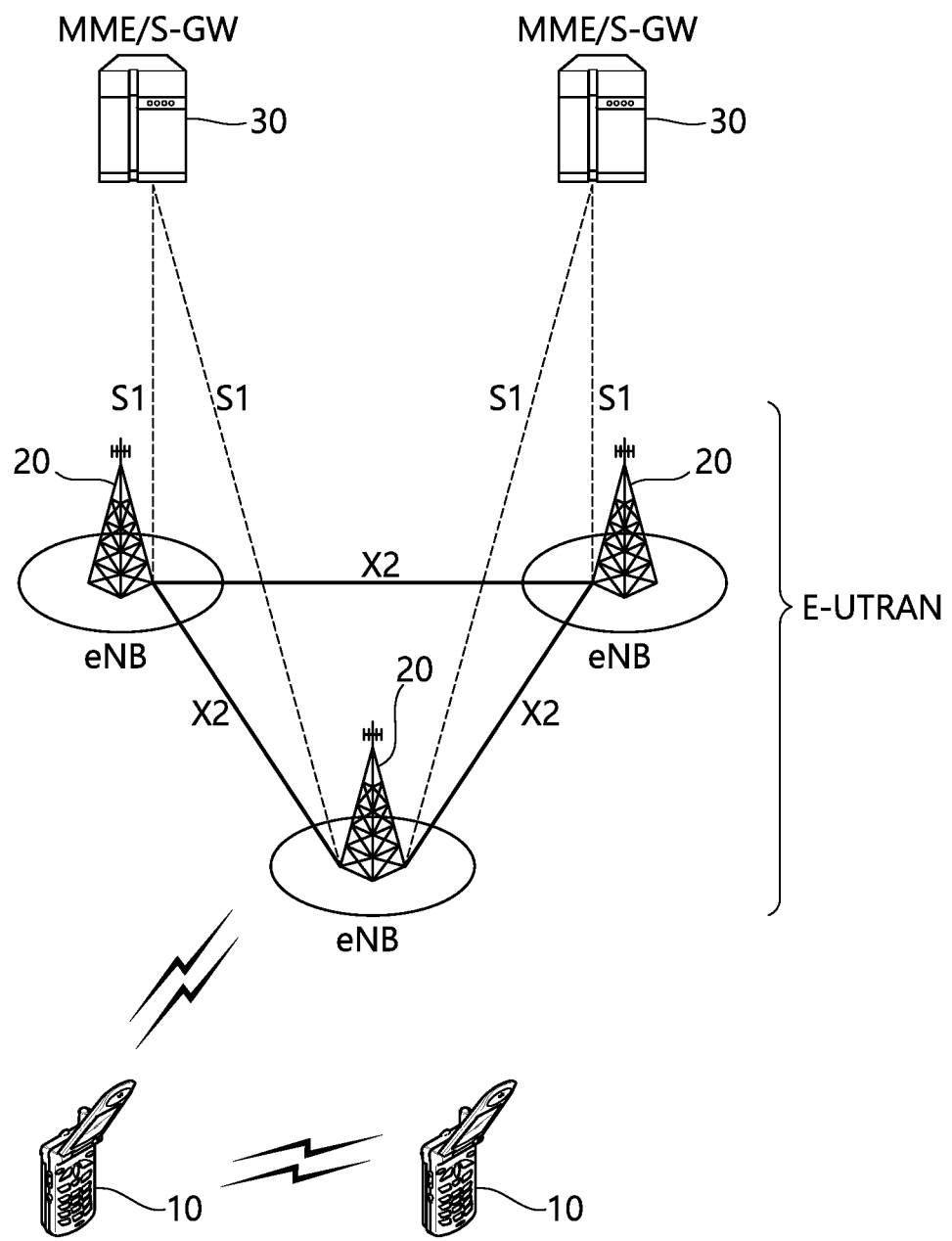
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
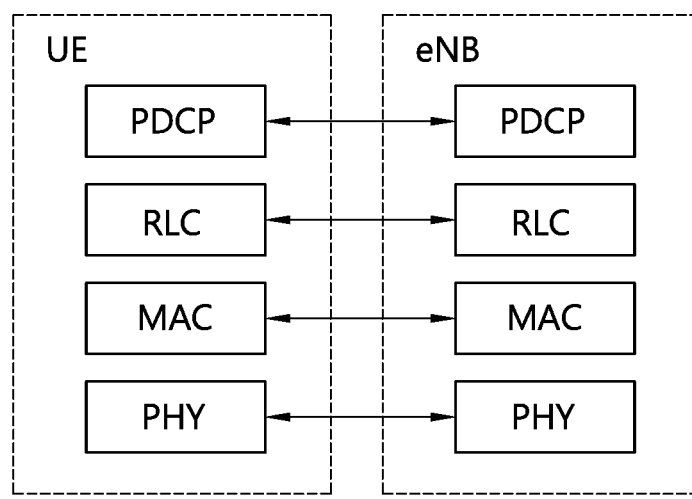
FIG. 2 shows a block diagram of a user plane protocol stack of an LTE system.
Figure 3:
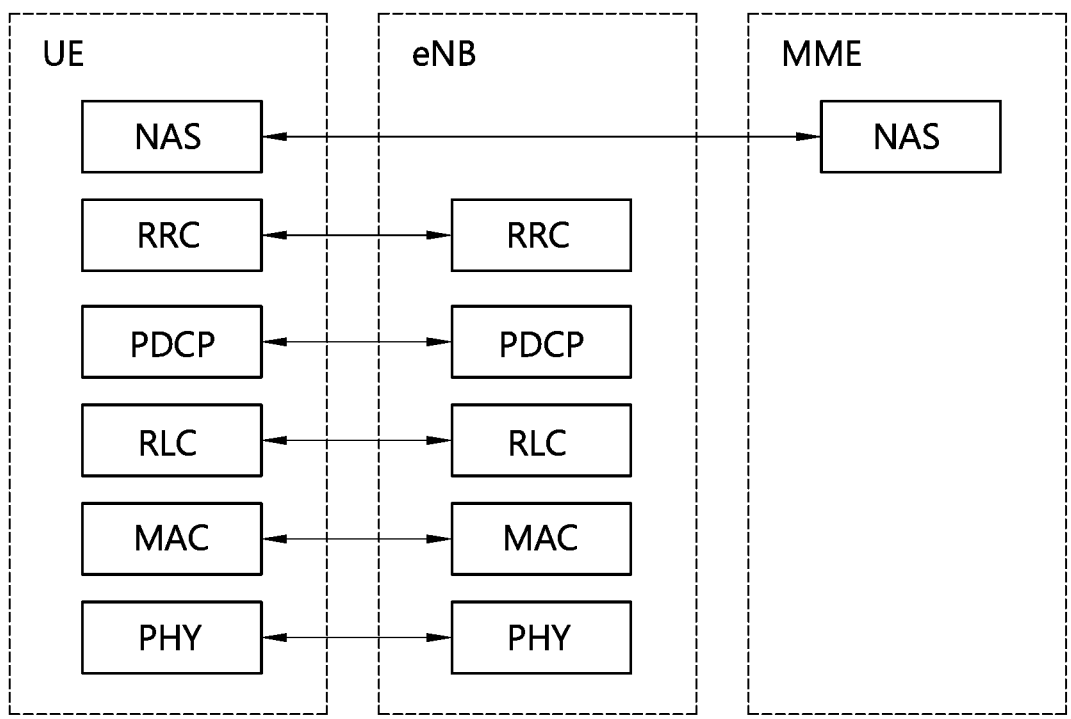
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

5G system is a 3GPP system consisting of 5G access network (AN), 5G core network (CN), and UE. 5G AN is an access network including new generation radio access network (NG-RAN) and/or non-3GPP access network connected to 5G CN.

Figure 4:
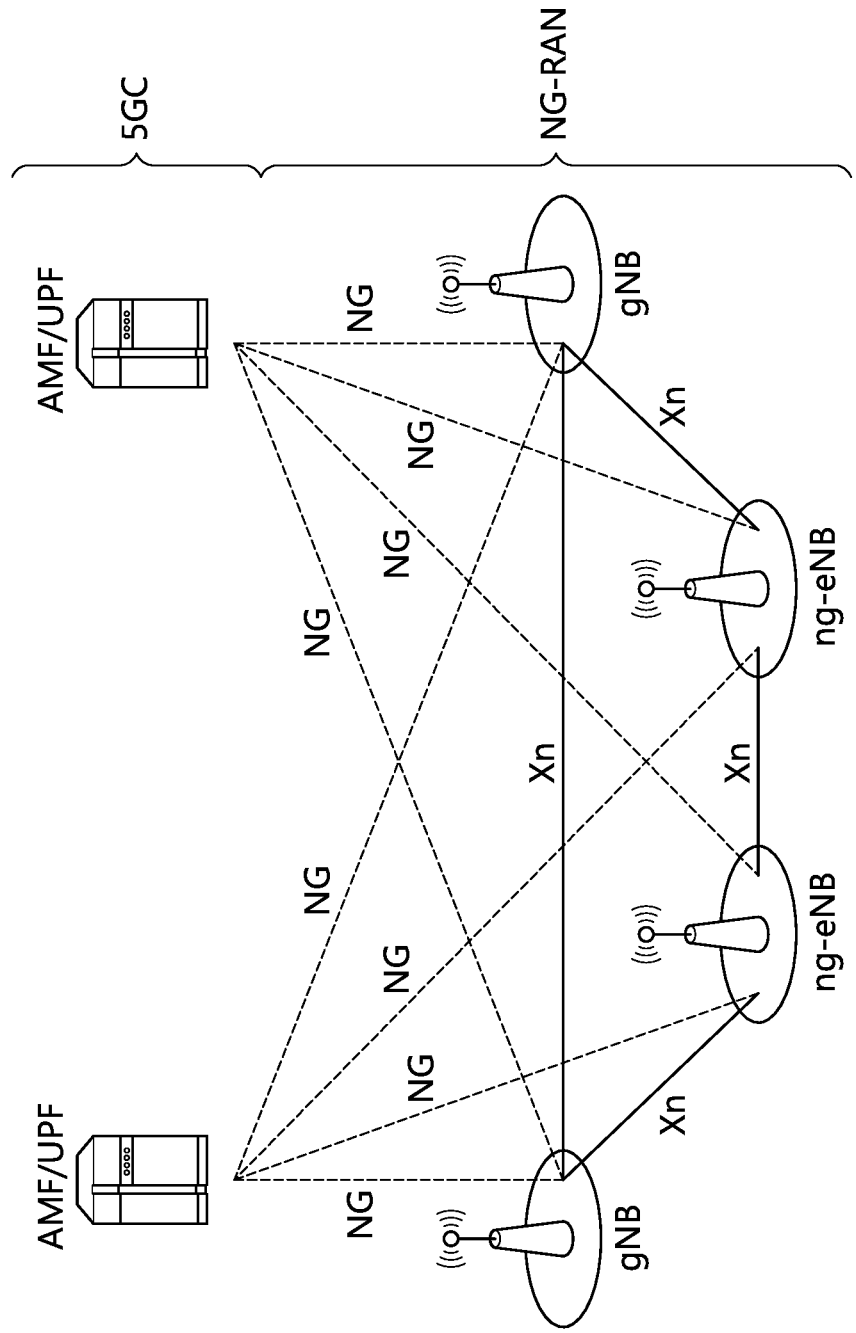
FIG. 4 shows an NG-RAN architecture.

FIG. 4 shows an NG-RAN architecture. Referring to FIG. 4, NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN, more specifically to the access and mobility management function (AMF) by means of the NG-C interface and to the user plane function (UPF) by means of the NG-U interface.

The gNB and ng-eNB host the following functions:
Functions for radio resource management: radio bearer control, radio admission control, connection mobility control, dynamic allocation of resources to UEs in both UL and DL (scheduling);
Internet protocol (IP) header compression, encryption and integrity protection of data;

Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or operations & maintenance (O&M));
Measurement and measurement reporting configuration for mobility and scheduling;
Transport level packet marking in the UL;
Session management;
Support of network slicing;
QoS flow management and mapping to data radio bearers;
Support of UEs in RRC_INACTIVE state;
Distribution function for NAS messages;
Radio access network sharing;
Dual connectivity;
Tight interworking between NR and E-UTRA.
The AMF hosts the following main functions:
NAS signaling termination;
NAS signaling security;
AS Security control;
Inter CN node signalling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.
The UPF hosts the following main functions:
Anchor point for intra-/inter-RAT mobility (when applicable);
External protocol data unit (PDU) session point of interconnect to data network;
Packet routing & forwarding;
Packet inspection and user plane part of policy rule enforcement;
Traffic usage reporting;
UL classifier to support routing traffic flows to a data network;
Branching point to support multi-homed PDU session;
Quality of service (QoS) handling for user plane, e.g. packet filtering, gating, UL/DL rate enforcement;
UL traffic verification (service data flow (SDF) to QoS flow mapping);
DL packet buffering and DL data notification triggering.
The SMF hosts the following main functions:
Session management;
UE IP address allocation and management;
Selection and control of user plane function;
Configures traffic steering at UPF to route traffic to proper destination;
Control part of policy enforcement and QoS;
DL data notification.

Figure 5:
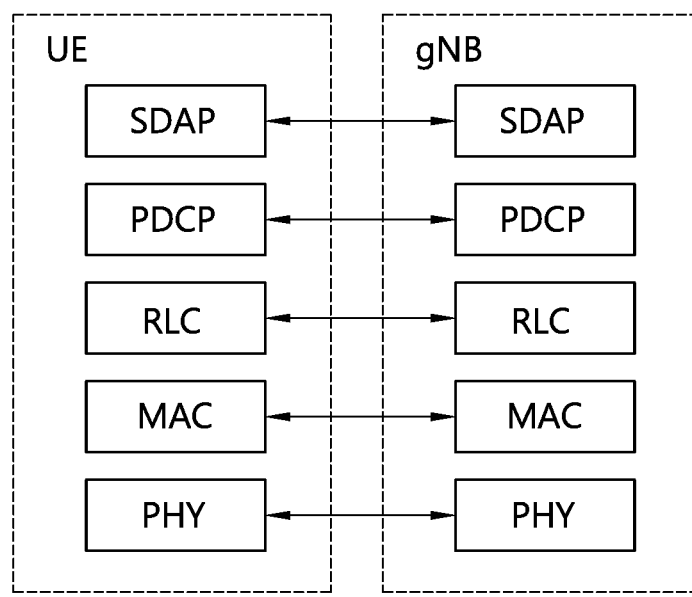
FIG. 5 shows a block diagram of a user plane protocol stack of an NR system.
Figure 6:
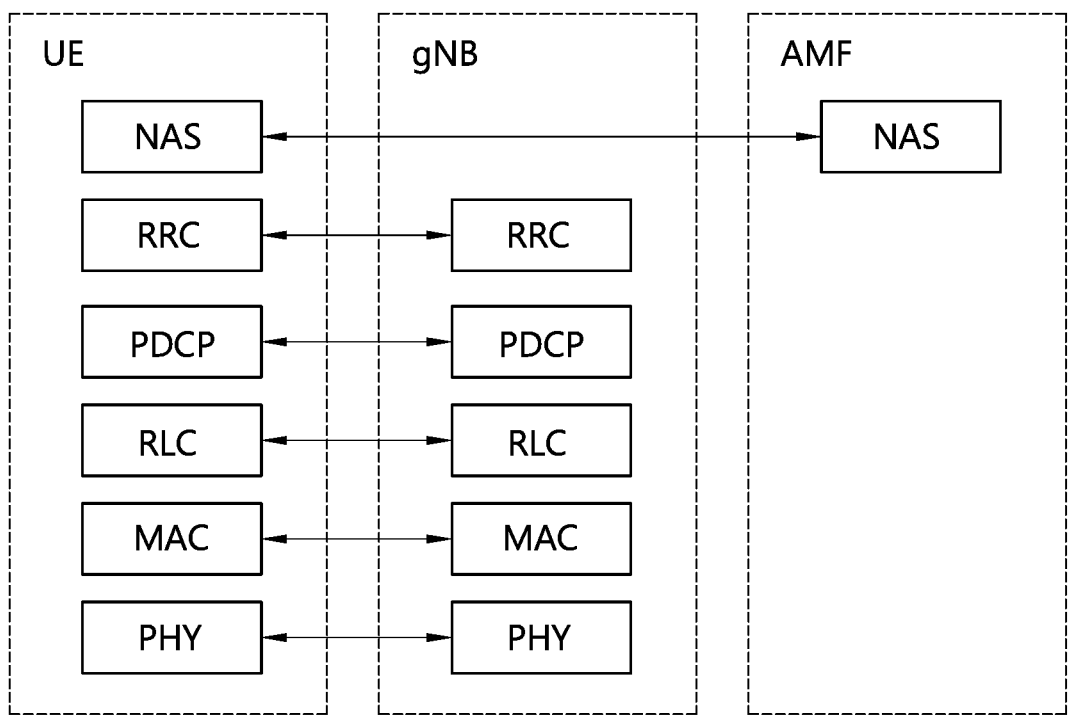
FIG. 6 shows a block diagram of a control plane protocol stack of an NR system.

FIG. 5 shows a block diagram of a user plane protocol stack of an NR system. FIG. 6 shows a block diagram of a control plane protocol stack of an NR system. Compared with the user plane protocol stack of the LTE system shown in FIG. 2, the user plane protocol stack the NR system further includes a service data adaptation protocol (SDAP) layer. The main services and functions of SDAP include mapping between a quality of service (QoS) flow and a data radio bearer, and marking QoS flow ID (QFI) in both DL and UL packets. The control plane protocol stack the NR system is as similar as the control plane protocol stack the NR system shown in FIG. 3.

UE positioning is described. Section 4, 5 and 7 of 3GPP TS 36.305 V14.1.0 (2017-13) may be referred.

The E-UTRAN may utilize one or more positioning methods in order to determine the position of an UE. Positioning the UE involves two main steps:
signal measurements; and
Position estimate and optional velocity computation based on the measurements.

The signal measurements may be made by the UE or the BS. The basic signals measured for terrestrial position methods are typically the E-UTRA radio transmissions. However, other methods may make use of other transmissions such as general radio navigation signals including those from global navigation satellites systems (GNSSs).

The positioning function should not be limited to a single method or measurement.

That is, it should be capable of utilizing other standard methods and measurements, as such methods and measurements are available and appropriate, to meet the required service needs of the location service client. This additional information could consist of readily available E-UTRAN measurements.

The standard positioning methods supported for E-UTRAN access are as follows.

(1) Network-assisted GNSS methods: These methods make use of UEs that are equipped with radio receivers capable of receiving GNSS signals.

(2) Downlink positioning: The downlink positioning method, e.g. observed time difference of arrival (OTDOA), makes use of the measured timing of DL signals received from multiple transmission points (TPs) at the UE. The UE measures the timing of the received signals using assistance data received from the positioning server, and the resulting measurements are used to locate the UE in relation to the neighboring TPs.

(3) Enhanced cell identity (ID) method: In the cell ID (CID) positioning method, the position of an UE is estimated with the knowledge of its serving BS and cell. The information about the serving BS and cell may be obtained by paging, tracking area update, or other methods Enhanced cell ID (E-CID) positioning refers to techniques which use additional UE and/or E-UTRAN radio resource and other measurements to improve the UE location estimate.

(4) Uplink positioning: The uplink positioning method, e.g. uplink time difference of arrival (UTDOA), makes use of the measured timing at multiple location measurement unit (LMUs) of UL signals transmitted from UE. The LMU measures the timing of the received signals using assistance data received from the positioning server, and the resulting measurements are used to estimate the location of the UE.

(5) Barometric pressure sensor method: The barometric pressure sensor method makes use of barometric sensors to determine the vertical component of the position of the UE. The UE measures barometric pressure, optionally aided by assistance data, to calculate the vertical component of its location or to send measurements to the positioning server for position calculation.

(6) WLAN method: The WLAN positioning method makes use of the WLAN measurements (AP identifiers and optionally other measurements) and databases to determine the location of the UE. The UE measures received signals from WLAN APs, optionally aided by assistance data, to send measurements to the positioning server for position calculation. Using the measurement results and a references database, the location of the UE is calculated.

(7) Bluetooth method: The Bluetooth positioning method makes use of Bluetooth measurements (beacon identifiers and optionally other measurements) to determine the location of the UE. The UE measures received signals from Bluetooth beacons. Using the measurement results and a references database, the location of the UE is calculated. The Bluetooth methods may be combined with other positioning methods (e.g. WLAN) to improve positioning accuracy of the UE.

(8) Terrestrial beacon system (TBS) method: A TBS consists method of a network of ground-based transmitters, broadcasting signals only for positioning purposes. The current type of TBS positioning signals are the metropolitan beacon system (MBS) signals and positioning reference signals (PRS). The UE measures received TBS signals, optionally aided by assistance data, to calculate its location or to send measurements to the positioning server for position calculation.

Hybrid positioning using multiple methods above is also supported. Standalone mode (e.g. autonomous, without network assistance) using one or more methods above is also supported.

The above positioning methods may be supported in UE-based, UE-assisted/E-SMLC-based, BS-assisted, and LMU-assisted/E-SMLC-based versions. Table 1 indicates which of these versions are supported for the standardized positioning methods.

TABLE 1

| Method | UE-based | UE-assisted (E-SMLC-based) | BS-assisted | LMU-assisted/ E-SMLC-based | SUPL |
|---|---|---|---|---|---|
| A-GNSS | Yes | Yes | No | No | Yes (UE-based and UE-assisted) |
| Downlink | No | Yes | No | No | Yes (UE-assisted) |
| E-CID | No | Yes | Yes | No | Yes (UE-assisted) |
| Uplink | No | No | No | Yes | No |
| Barometric | Yes | Yes | No | No | No |
| WLAN | Yes | Yes | No | No | Yes |
| Bluetooth | No | Yes | No | No | No |
| TBS | Yes | Yes | No | No | Yes (MBS) |

Barometric pressure sensor, WLAN, Bluetooth, and TBS positioning methods based on MBS signals are also supported in standalone mode.

Figure 7:
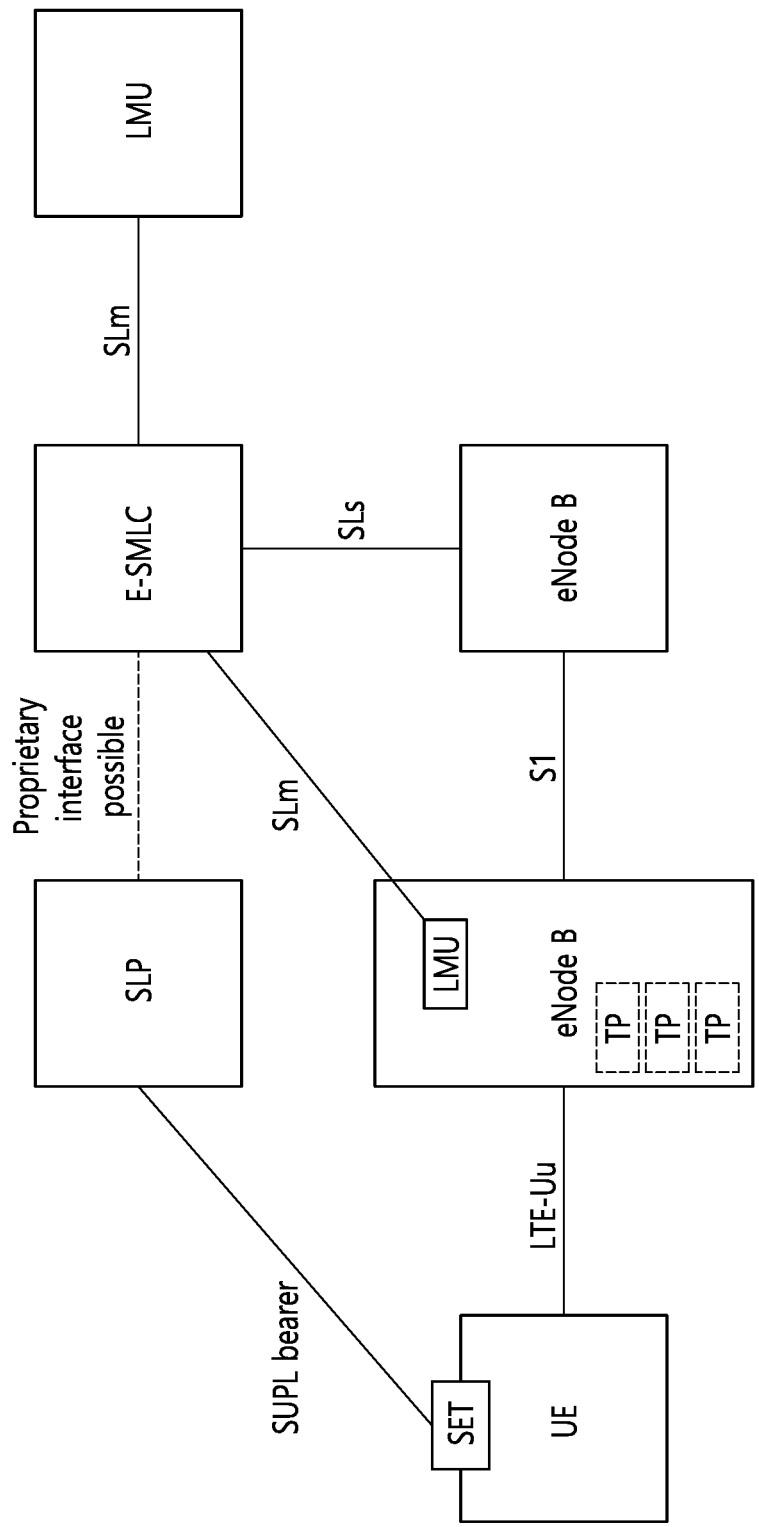
FIG. 7 shows an architecture in evolved packet system (EPS) applicable to positioning of a UE with E-UTRAN access.

FIG. 7 shows an architecture in evolved packet system (EPS) applicable to positioning of a UE with E-UTRAN access. The MME receives a request for some location service associated with a particular target UE from another entity (e.g., gateway mobile location center (GMLC) or UE) or the MME itself decides to initiate some location service on behalf of a particular target UE (e.g. for an IP multimedia subsystem (IMS) emergency call from the UE). The MME then sends a location services request to an E-SMLC. The E-SMLC processes the location services request which may include transferring assistance data to the target UE to assist with UE-based and/or UE-assisted positioning and/or may include positioning of the target UE. For the uplink method, the E-SMLC processes the location services request which includes transferring configuration data to the selected LMU (s). The E-SMLC then returns the result of the location service back to the MME (e.g. a position estimate for the UE and/or an indication of any assistance data transferred to the UE). In the case of a location service requested by an entity other than the MME (e.g. UE or E-SMLC), the MME returns the location service result to this entity. The secure user plane location (SUPL) location platform (SLP) is the SUPL entity responsible for positioning over the user plane. An eNB may control several TPs, such as remote radio heads, or PRS-only TPs for support of PRS-based TBS.

Positioning procedures in the E-UTRAN are modelled as transactions of the LTE positioning protocol (LPP). A procedure consists of a single operation of one of the following types:

Exchange of positioning capabilities;
Transfer of assistance data;
Transfer of location information (positioning measurements and/or position estimate);
Error handling;
Abort.

Parallel transactions are permitted (i.e. a new LPP transaction may be initiated, while another one is outstanding).

The protocol operates between a "target" and a "server". In the control-plane context, these entities are the UE and E-SMLC respectively. In the SUPL context, they are the SET and the SLP. A procedure may be initiated by either the target or the server. Both target initiated and server initiated procedures are supported.

Figure 8:
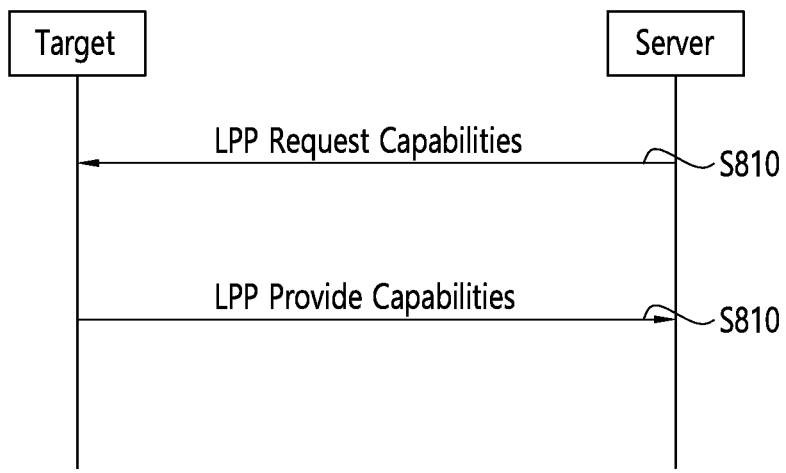
FIG. 8 shows an example of a LPP capability transfer procedure.

FIG. 8 shows an example of a LPP capability transfer procedure. Capabilities in an LPP context refer to the ability of a target or server to support different position methods defined for LPP, different aspects of a particular position method (e.g. different types of assistance data for A-GNSS) and common features not specific to only one position method (e.g. ability to handle multiple LPP transactions). These capabilities are defined within the LPP protocol and transferred between the target and the server using LPP transport.

Referring to FIG. 8, in step S800, the server may send a request for the LPP related capabilities of the target. In step S810, the target transfers its LPP-related capabilities to the server. The capabilities may refer to particular position methods or may be common to multiple position methods.

Figure 9:
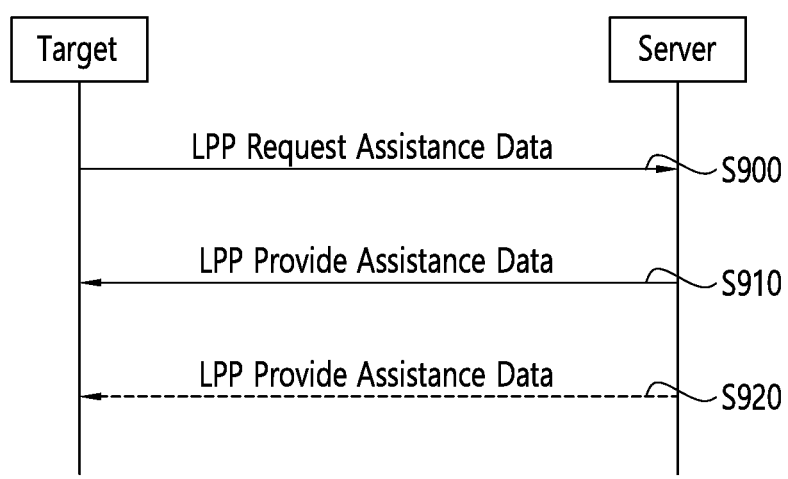
FIG. 9 shows an example of a LPP assistance data transfer procedure.

FIG. 9 shows an example of a LPP assistance data transfer procedure. Assistance data may be transferred either by request or unsolicited. Assistance data delivery is supported only via unicast transport from server to target.

Referring to FIG. 9, in step S900, the target may send a request to the server for assistance data and may indicate the particular assistance data needed. In step S910, the server transfers assistance data to the target. The transferred assistance data should match any assistance data requested in step S900. In step S920, optionally, the server may transfer additional assistance data to the target in one or more additional LPP messages.

Figure 10:
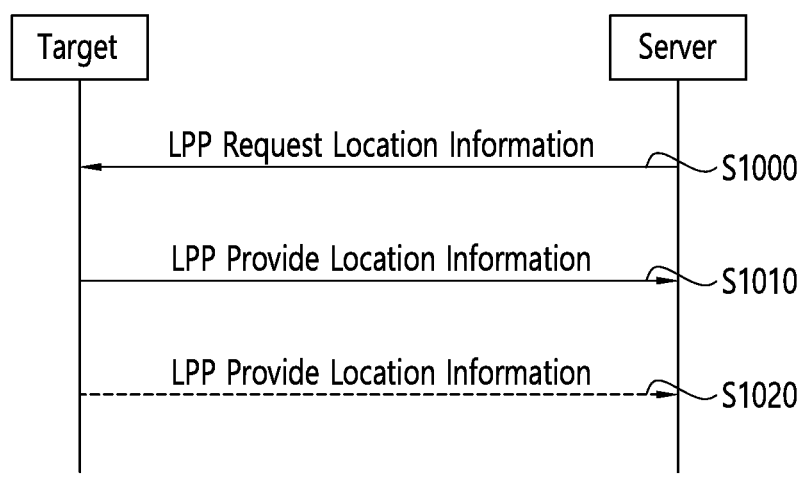
FIG. 10 shows an example of a LPP location information transfer procedure.

FIG. 10 shows an example of a LPP location information transfer procedure. The term "location information" applies both to an actual position estimate and to values used in computing position (e.g. radio measurements or positioning measurements). It is delivered either in response to a request or unsolicited.

In step S1000, the server may send a request for location information to the target, and may indicate the type of location information needed and associated quality of service (QoS). In step S1010, in response to step S1000, the target transfers location information to the server. The location information transferred should match the location information requested in step S1000. In step S1020, optionally (e.g. if requested in step S1010), the target may transfer additional location information to the server in one or more additional LPP messages.

Global navigation satellite system (GNSS) is the standard generic term for satellite navigation systems that provide autonomous geo-spatial positioning with global or regional coverage. The following GNSSs are supported:

GPS and its modernization;
Galileo;
GLONASS;
Satellite based augmentation systems (SBAS), including WAAS, EGNOS, MSAS, and GAGAN;
Quasi-Zenith satellite system (QZSS);
BeiDou navigation satellite system (BDS).

Each global GNSS can be used individually or in combination with others. When used in combination, the effective number of navigation satellite signals would be increased:

extra satellites can improve availability (of satellites at a particular location) and results in an improved ability to work in areas where satellite signals can be obscured, such as in urban canyons;
extra satellites and signals can improve reliability, i.e. with extra measurements the data redundancy is increased, which helps identify any measurement outlier problems;
extra satellites and signals can improve accuracy due to improved measurement geometry and improved ranging signals from modernized satellites.

When GNSS is designed to inter-work with the E-UTRAN, the network assists the UE GNSS receiver to improve the performance in several respects. These performance improvements will:

reduce the UE GNSS start-up and acquisition times; the search window can be limited and the measurements speed up significantly;
increase the UE GNSS sensitivity; positioning assistance messages are obtained via E-UTRAN so the UE GNSS receiver can operate also in low SNR situations when it is unable to demodulate GNSS satellite signals;
allow the UE to consume less handset power than with stand-alone GNSS; this is due to rapid start-up times as the GNSS receiver can be in idle mode when it is not needed.

The network-assisted GNSS methods rely on signaling between UE GNSS receivers (possibly with reduced complexity) and a continuously operating GNSS reference receiver network, which has clear sky visibility of the same GNSS constellation as the assisted UEs. Two assisted modes are supported:

UE-Assisted: The UE performs GNSS measurements (pseudo-ranges, pseudo Doppler, etc.) and sends these measurements to the E-SMLC where the position calculation takes place, possibly using additional measurements from other (non GNSS) sources;

UE-Based: The UE performs GNSS measurements and calculates its own location, possibly using additional measurements from other (non GNSS) sources.

The assistance data content may vary depending on whether the UE operates in UE-Assisted or UE-Based mode.

The assistance data signaled to the UE can be broadly classified into:

data assisting the measurements: e.g. reference time, visible satellite list, satellite signal Doppler, code phase, Doppler and code phase search windows;

data providing means for position calculation: e.g. reference time, reference position, satellite ephemeris, clock corrections.

A UE with GNSS measurement capability may also operate in an autonomous (standalone) mode. In autonomous mode, the UE determines its position based on signals received from GNSS without assistance from the network.

Table 2 shows A-GNSS-Provide Capabilities information element (IE), which is an example of GNSS capability information. The IE A-GNSS-Provide-Capabilities is used by the target device to indicate its capability to support A-GNSS and to provide it's A-GNSS location capabilities (e.g. GNSSs and assistance data supported) to the location server.

TABLE 2

```
-- ASN1START
A-GNSS-ProvideCapabilities ::= SEQUENCE {
    gnss-SupportList                    GNSS-SupportList
    OPTIONAL,
    assistanceDataSupportList           AssistanceDataSupportList
    OPTIONAL,
    locationCoordinateTypes             LocationCoordinateTypes
    OPTIONAL,
    velocityTypes                       VelocityTypes
    OPTIONAL,
    ...,
    [[ periodicalReportingNotSupported-r14
                                                          PositioningModes
                    OPTIONAL,
                idleStateForMeasurements-r14
                                                          ENUMERATED
    { required }             OPTIONAL
    ]]
}
GNSS-SupportList ::= SEQUENCE (SIZE(1..16)) OF GNSS-SupportElement
GNSS-SupportElement ::= SEQUENCE {
    gnss-ID                             GNSS-ID,
    sbas-IDs                            SBAS-IDs
                    OPTIONAL, -- Cond GNSS-ID-SBAS
    agnss-Modes                         PositioningModes,
    gnss-Signals                        GNSS-SignalIDs,
    fta-MeasSupport                     SEQUENCE {
```

TABLE 2-continued

```
    cellTime        AccessTypes,
                                                    mode
    PositioningModes,
                                }
                        OPTIONAL, -- Cond fta
    adr-Support                             BOOLEAN,
    velocityMeasurementSupport      BOOLEAN,
    ...
}
AssistanceDataSupportList ::= SEQUENCE {
    gnss-CommonAssistanceDataSupport    GNSS-CommonAssistanceDataSupport,
    gnss-GenericAssistanceDataSupport   GNSS-GenericAssistanceDataSupport,
    ...
}
-- ASN1STOP
```

Referring to Table 2, the IE A-GNSS-Provide-Capabilities includes agnss-Modes field, which is indicated by PositioningModes IE. Table 3 shows PositioningModes IE. The IE PositioningModes is used to indicate several positioning modes using a bit map.

TABLE 3

```
-- ASN1START
PositioningModes ::= SEQUENCE {
    posModes    BIT STRING {   standalone  (0),
                                            ue-based
    (1),
                                            ue-assisted
    (2) } (SIZE (1..8)),
    ...
}
-- ASN1STOP
```

Referring to Table 3, the IE PositioningModes incluedes posModes field, which specifies the positioning mode(s). This is represented by a bit string, with a one-value at the bit position means the particular positioning mode is addressed. A zero-value means not addressed.

As described above, in legacy positioning scheme, either one of UE-based or UE-assisted mode is supported to perform positioning measurement, even though both modes are supported. In UE-based mode, a UE performs the position calculation based on the measurement by itself, and then, reports its calculated position to the E-SMLC. On the other hand, in UE-assisted mode, code phase and Doppler measurement may be measured by a UE, then reported to the E-SMLC where the UE's position is calculated. In UE-assisted mode, the UE can reduce power consumption, since the E-SMLC calculates the position of the UE based on the measurement information reported by the UE. Therefore, UE-assisted mode may be well suited for devices with limited computational and power capability, such as devices employing internet-of-things (IoT) applications (e.g. narrowband-IOT (NB-IoT), wearable).

However, once the UE moves to enhanced coverage (or cell-edge), it may be necessary to boost its transmission power and number of transmissions. That is, when a UE operating UE-assisted mode is located in enhanced coverage, it may be necessary to boost its transmission power in order to provide the measurement information for positioning calculation to the E-SMLC. Moreover, it may be failed to transmit measurement information due to channel conditions. Moreover, if a UE is set to enable periodical reporting, the power consumption as well as signaling will be increased. As a result, from the perspective of the UE, the power consumption due to periodic reporting of measurement information may be increased.

Accordingly, in terms of power consumption, a UE in enhanced coverage may be preferable to autonomously estimate the position according to the UE-based mode, rather than providing measurement information repeatedly according to the UE-assisted mode. Especially, it may be useful for energy sensitive scenarios such as machine type communication (MTC) UE.

In order to solve the problem described above, a method for supporting hybrid mode positioning scheme according to the present invention is proposed below. In the description below, it is assumed that a UE supports both UE-assisted positioning measurement mode and UE-based positioning measurement mode. In addition, it is assumed that the UE is able to support periodical reporting of measurement information for positioning measurement.

According to the present invention, which mode (i.e. either UE-assisted mode or the UE-based mode) to use for position measurement is selected depending on the configured condition (i.e. UE's location). This proposed scheme may be applied to various positioning methods such as A-GNSS, Downlink (OTDOA), Barometric, TBS, etc.

The network, i.e. E-SMLC, provides a configuration of a triggering condition for mode switch to the UE. That is, the network configures a triggering condition for mode switch to the UE. One example of the triggering condition may be whether the UE moves to enhanced coverage. One example of the triggering condition may be received reference signal received power (RSRP). However, the triggering condition may not limited to above examples. The configuration of the triggering condition for mode switch may be provided via dedicated signaling or broadcasted signaling. By using the triggering condition for mode switch, the UE can switch positioning mode from UE-assisted mode to UE-based mode, or vice versa.

Furthermore, while the UE in RRC_IDLE moves from a serving cell to another cell, system information may notify whether the corresponding cell supports hybrid mode positioning scheme or not. Accordingly, the UE can determine whether to use the hybrid mode positioning scheme or not. In addition, the UE may report its estimated location when it is in normal coverage (not in enhanced coverage) or its measured RSRP is higher than a certain threshold.

Figure 11:
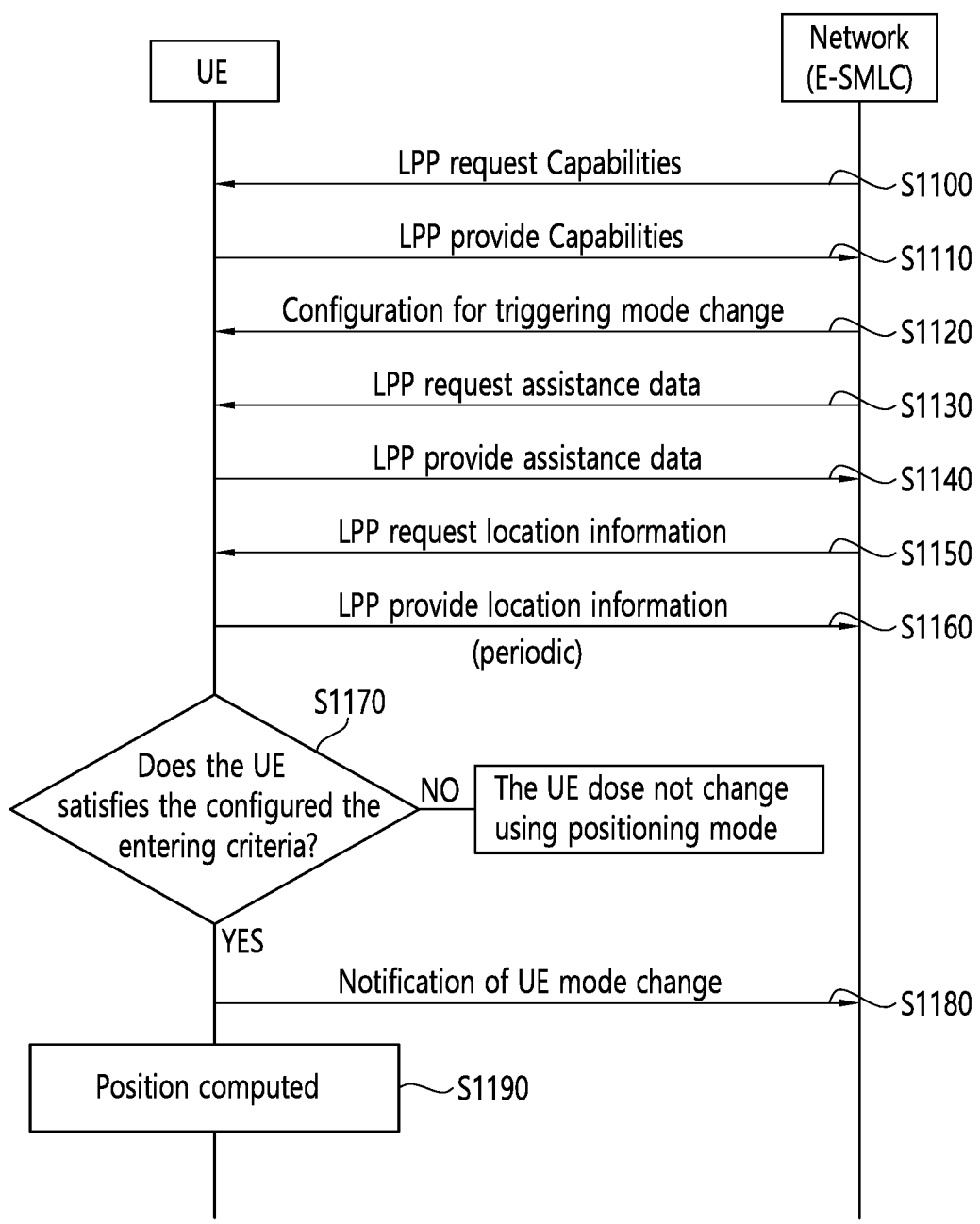
FIG. 11 shows an example of a method for hybrid mode positioning scheme according to an embodiment of the present invention.

FIG. 11 shows an example of a method for hybrid mode positioning scheme according to an embodiment of the present invention. The disclosure of the present invention may be applied to this embodiment.

In step S1100, the E-SMLC may send a request for the LPP related capabilities of the target UE. In step S1110, the UE transfers its LPP-related capabilities to the E-SMLC. The capabilities may refer to both UE-based and UE-assisted mode in addition to, it reports to support periodical reporting.

In step S1120, the E-SMLC configures a triggering condition for positioning mode switch. The triggering condition for positioning mode switch may be as follows.

(1) Switching from UE-assisted Mode to UE-based Mode

The UE may be allowed to switch its positioning mode from UE-assisted mode to UE-based mode when it is in enhance coverage.

The UE may be allowed to switch its positioning mode from UE-assisted mode to UE-based mode when measured RSRP is lower than configured threshold.

(2) Switching from UE-based Mode to UE-assisted Mode

The UE may be allowed to switch its positioning mode from UE-based mode to UE-assisted mode when it is in normal coverage.

The UE may be allowed to switch its positioning mode from UE-based mode to UE-assisted mode when measured RSRP is higher than configured threshold.

In step S1130, the UE may send a request to the E-SMLC for assistance data and may indicate the particular assistance data needed. In step S1140, the E-SMLC transfers assistance data to the UE. The transferred assistance data should match any assistance data requested.

In step S1150, the E-SMLC may send a request for location information to the target, and may indicate the type of location information needed. In step S1160, the UE periodically transfers positioning measurements or position estimate to the E-SMLC.

In step S1170, when the triggering condition for positioning mode switch is satisfied, it is allowed to switch positioning mode. That is, when the UE moves to enhance coverage or measured RSRP is lower than configured threshold, the UE may be allowed to switch its positioning mode from UE-assisted mode to UE-based mode. Or, when the UE moves to normal coverage or measured RSRP is higher than configured threshold, the UE may be allowed to switch its positioning mode from UE-based to UE-assisted mode. When the triggering condition for positioning mode switch is not satisfied, the UE does not switch its positioning mode. In this embodiment, it is assumed that the positioning mode of the UE is switched from UE-assisted mode to UE-based mode.

In step S1180, the UE notifies the switch of positioning mode. That is, when the positioning mode of the UE is switched from UE-assisted mode to UE-based mode, the UE may notify the switch of positioning mode from UE-assisted mode to UE-based mode. When the positioning mode of the UE is switched from UE-based mode to UE-assisted mode, the UE may notify the switch of positioning mode from UE-based mode to UE-assisted mode. In this embodiment, since it is assumed that the positioning mode of the UE is switched from UE-assisted mode to UE-based mode, the UE notifies the switch of positioning mode from UE-assisted mode to UE-based mode In step S1190, the UE performs position measurements and calculates its own location.

Figure 12:
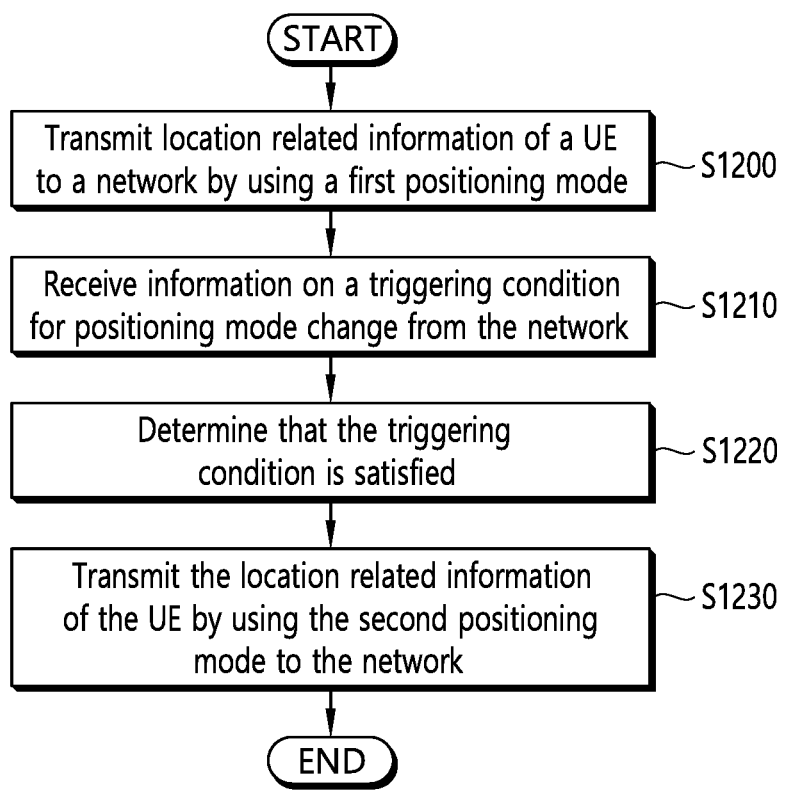
FIG. 12 shows a method performing a positioning mode switch from a first positioning mode to a second positioning mode by a UE according to an embodiment of the present invention.

FIG. 12 shows a method performing a positioning mode switch from a first positioning mode to a second positioning mode by a UE according to an embodiment of the present invention. The disclosure of the present invention may be applied to this embodiment.

In step S1200, the UE transmits location related information of the UE to a network by using the first positioning mode. In step S1210, the UE receives information on a triggering condition for the positioning mode switch from the network. In step S1220, the UE determines that the triggering condition is satisfied. In step S1230, the UE transmits location related information of the UE by using the second positioning mode to the network.

The first positioning mode may be a UE-assisted mode in which the UE performs measurements and transmits information on the measurements to the network where location of the UE is calculated, and the second positioning mode may be a UE-based mode in which the UE performs measurements and calculates its own location. In this case, the triggering condition may be that the UE is in an enhanced coverage, or that a measured RSRP is lower than a threshold, which is included in the information on the triggering condition.

Alternatively, the first positioning mode may be a UE-based mode in which the UE performs measurements and calculates its own location, and the second positioning mode may be a UE-assisted mode in which the UE performs measurements and transmits information on the measurements to the network where location of the UE is calculated. In this case, the triggering condition may be that the UE is in a normal coverage, or that a measured RSRP is higher than a threshold, which is included in the information on the triggering condition.

The UE may notify the position mode switch from the first positioning mode to the second positioning mode to the network. The UE may receive information on whether a serving cell supports the positioning mode switch by the triggering condition or not from the serving cell via system information.

The network may be E-SMLC. The location related information is information for an assisted global navigation satellite system (A-GNSS) method, a downlink positioning method, a barometric pressure sensor method, or a TBS method.

Figure 13:
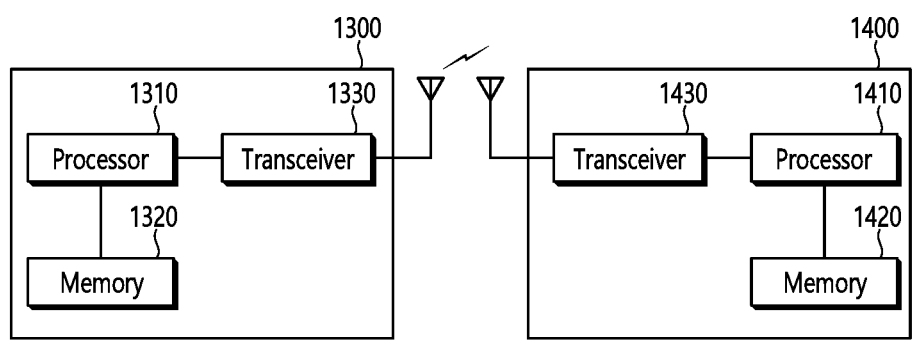
FIG. 13 shows a wireless communication system to implement an embodiment of the present invention.

FIG. 13 shows a wireless communication system to implement an embodiment of the present invention.

A UE 1300 includes a processor 1310, a memory 1320 and a transceiver 1330. The processor 1310 may be configured to implement proposed functions, procedures and/or methods described in this description. Layers of the radio interface protocol may be implemented in the processor 1310. The memory 1320 is operatively coupled with the processor 1310 and stores a variety of information to operate the processor 1310. The transceiver 1330 is operatively coupled with the processor 1310, and transmits and/or receives a radio signal.

A network node 1400 includes a processor 1410, a memory 1420 and a transceiver 1430. The processor 1410 may be configured to implement proposed functions, procedures and/or methods described in this description. Layers of the radio interface protocol may be implemented in the processor 1410. The memory 1420 is operatively coupled with the processor 1410 and stores a variety of information to operate the processor 1410. The transceiver 1430 is operatively coupled with the processor 1410, and transmits and/or receives a radio signal.

The processors 1310, 1410 may include application-specific integrated circuit (ASIC), other chipset, logic circuit and/or data processing device. The memories 1320, 1420 may include read-only memory (ROM), random access memory (RAM), flash memory, memory card, storage medium and/or other storage device. The transceivers 1330, 1430 may include baseband circuitry to process radio frequency signals. When the embodiments are implemented in software, the techniques described herein can be implemented with modules (e.g., procedures, functions, and so on) that perform the functions described herein. The modules can be stored in memories 1320, 1420 and executed by processors 1310, 1410. The memories 1320, 1420 can be implemented within the processors 1310, 1410 or external to the processors 1310, 1410 in which case those can be communicatively coupled to the processors 1310, 1410 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
    transmitting, to a network, location related information of the UE by using a first positioning mode,
    wherein the first positioning mode is a UE-assisted mode in which the UE performs measurements and transmits information on the measurements to the network where location of the UE is calculated;
    receiving, from the network, information on a triggering condition for switching from the first positioning mode to a second positioning mode,
    wherein the triggering condition is that the UE is in an enhanced coverage; and
    transmitting, to the network, location related information of the UE by using the second positioning mode based on that the UE is in the enhanced coverage,
    wherein the second positioning mode is a UE-based mode in which the UE performs measurements and calculates its own location.

2. The method of claim 1, further comprising notifying the position mode switch from the first positioning mode to the second positioning mode to the network.

3. The method of claim 1, further comprising receiving information on whether a serving cell supports the positioning mode switch by the triggering condition or not from the serving cell via system information.

4. The method of claim 1, wherein the network is an evolved serving mobile location center (E-SMLC).

5. The method of claim 1, wherein the location related information is information for an assisted global navigation satellite system (A-GNSS) method, a downlink positioning method, or a terrestrial beacon system (TBS) method.

6. A user equipment (UE) in a wireless communication system, the UE comprising:
    a memory;
    a transceiver; and
    a processor, coupled to the memory and the transceiver, that:
        controls the transceiver to transmit, to a network, location related information of the UE by using a first positioning mode,
        wherein the first positioning mode is a UE-assisted mode in which the UE performs measurements and transmits information on the measurements to the network where location of the UE is calculated;
        controls the transceiver to receive, from the network information on a triggering condition for switching from the first positioning mode to a second positioning mod,
        wherein the triggering condition is that the UE is in an enhanced coverage;
        controls the transceiver to transmit, to the network, location related information of the UE by using a second positioning mode based on that the UE is in the enhanced coverage,
        wherein the second positioning mode is a UE-based mode in which the UE performs measurements and calculates its own location.

7. The method of claim 1, further comprising notifying the position mode switch from the first positioning mode to the second positioning mode to the network.

8. The method of claim 1, wherein the UE is in communication with at least one of a mobile device, a network, and/or autonomous vehicles other than the UE.

* * * * *